United States Patent
Lassiter

(10) Patent No.: US 6,354,261 B1
(45) Date of Patent: Mar. 12, 2002

(54) IMPACT SENSITIVE FUEL CONTROL SYSTEM

(76) Inventor: Arthur Thomas Lassiter, 118 Pacific Dr., Statesville, NC (US) 28677

(*) Notice: Subject to any disclaimer, the term of this patent is extended or adjusted under 35 U.S.C. 154(b) by 0 days.

(21) Appl. No.: 09/706,308

(22) Filed: Nov. 3, 2000

Related U.S. Application Data

(60) Provisional application No. 60/163,771, filed on Nov. 5, 1999.

(51) Int. Cl.[7] .................................................. F02B 77/00
(52) U.S. Cl. ................... 123/198 D; 180/284
(58) Field of Search ...................... 123/198 D, 198 DB; 137/38; 180/271, 284

(56) References Cited

U.S. PATENT DOCUMENTS 3,550,717 A * 12/1970 Doty, Jr. ..................... 180/284

* cited by examiner

*Primary Examiner*—Noah P. Kamen
(74) *Attorney, Agent, or Firm*—Malcolm E. Whittaker

(57) ABSTRACT

An impact sensitive fuel supply control system comprising a fuel cell and a fuel line connecting said fuel cell to an engine, an electromechanically activated valve connected to said fuel line, a fuel pump located proximate to said engine, an impact sensative mechanical limit switch coupled to a limit switch locator mounted on or adjacent to said fuel pump, said electromechanically activated valve and said impact sensative mechanical limit switch in series in an electrical circuit which is interrupted when said switch and said limit switch locator are dislocated.

19 Claims, 10 Drawing Sheets

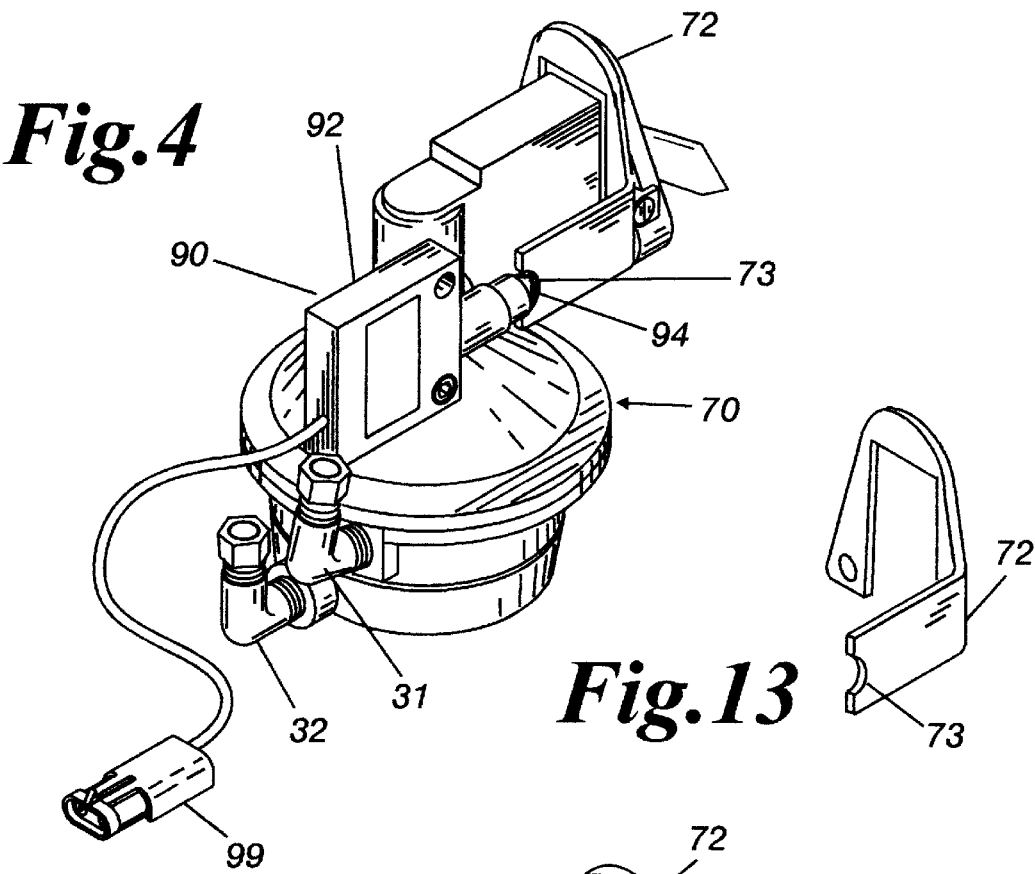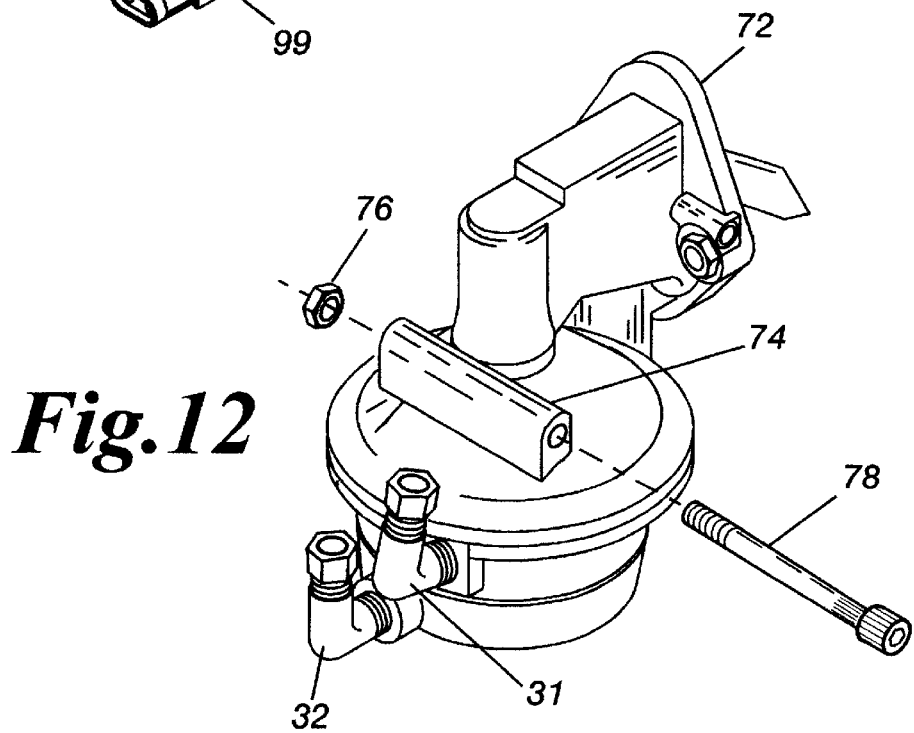

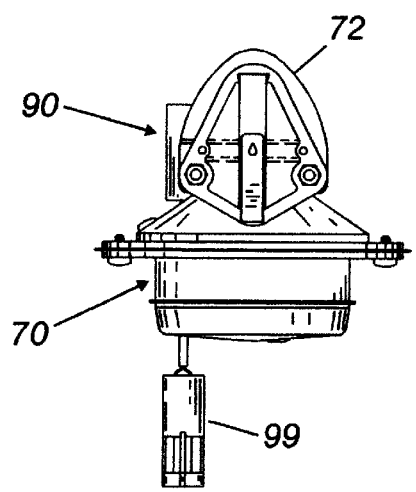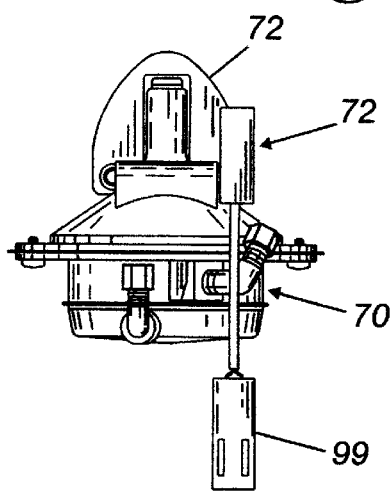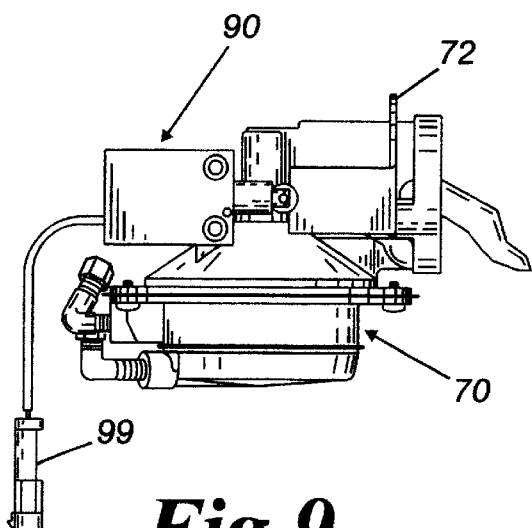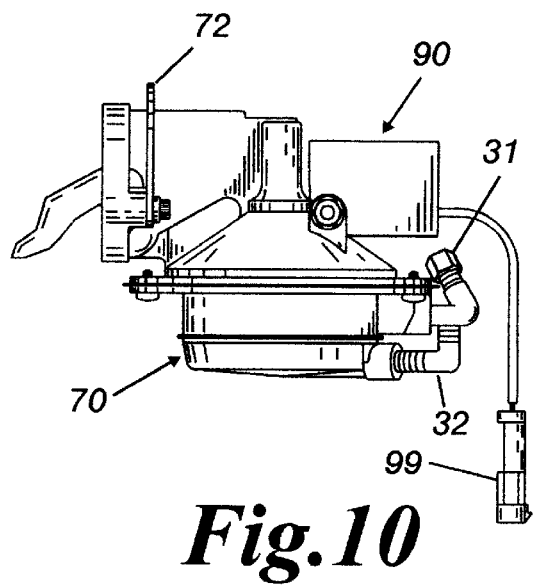

US 6,354,261 B1

IMPACT SENSITIVE FUEL CONTROL SYSTEM

RELATED APPLICATION

Applicant claims the benefit of a provisional patent application filed on Nov. 5, 1999, with Ser. No. 60/163,771.

Attorneys for Inventor: Malcolm E. Whittaker, Registered Patent Attorney No. 37,965, Mineo & Whittaker, P.O. Box 10615, Charlotte, N.C. 28212

BRIEF DESCRIPTION OF THE DRAWINGS

FIG. 4 is a perspective view of the fuel pump assembly of the present invention.

FIG. 7 is a back view of the fuel pump and related microswitch of the present invention.

FIG. 8 is a front view of the fuel pump and related microswitch of the present invention.

FIG. 9 is a right side view of the fuel pump and related microswitch of the present invention.

FIG. 10 is a left side view of the fuel pump and related microswitch of the present invention.

FIG. 12 is a perspective view of the fuel pump assembly showing the nut and bolt which fasten the fuel pump assembly to the microswitch assembly.

FIG. 13 is a perspective view of the bracket which fastens the fuel pump assembly to the engine block of a typical race car.

DESCRIPTION OF THE INVENTION

Figure 1:
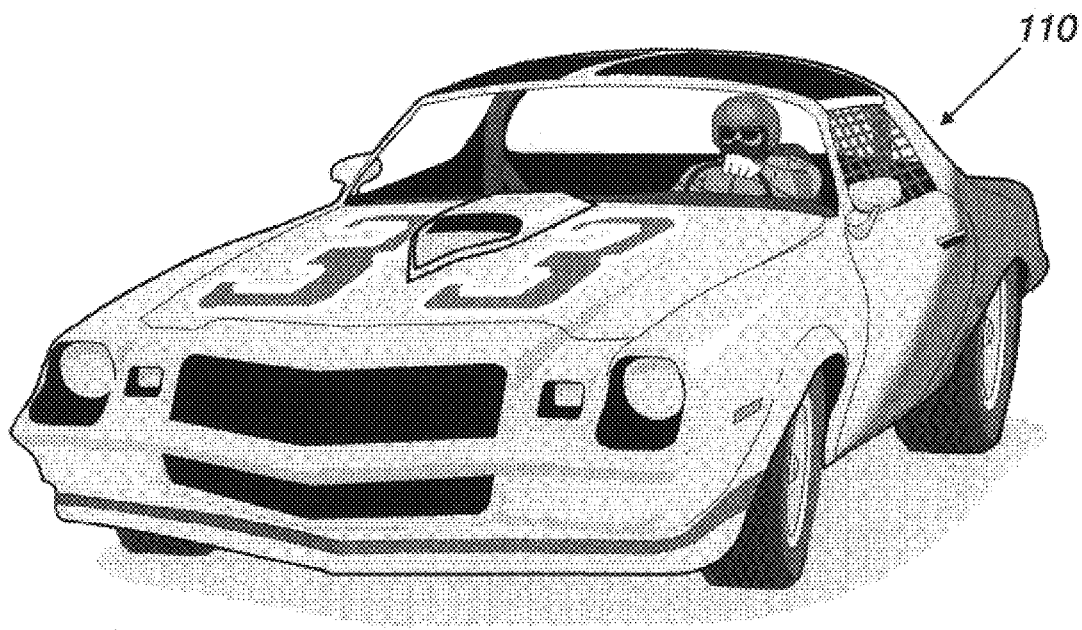
FIG. 1 is a perspective view of a typical race car.

In recent years, the National Association for Stock Car Automobile Racing ("NASCAR") has increased in popularity. Because of the increased popularity of NASCAR, ever increasing numbers of races are being added to the NASCAR racing schedule and increasing numbers of Stock Cars are competing in NASCAR races. In the past few years, there have been a substantial number of "underhood" fires in cars competing in NASCAR races. In most cases, these underhood fires have been caused by race cars crashing into guard rails, pit walls or outside retaining walls which surround the race track. In many cases, the crash will break the race car's fuel pump off the engine block or the fuel line being broken off the fuel pump. One of the main causes of the fuel pump and fuel line breakage is the close proximity of the fuel pump and fuel line to the race car's main front cross member. NASCAR rules and regulations mandate the position of the fuel pump and fuel lines in the race car.

As stated by the name, a "fuel pump" pumps fuel from the fuel cell to the race car's engine. Typically, the words "fuel cell" and "gas tank" are interchangeable.

As is well known in NASCAR, NASCAR rules and regulations mandate the position of both the fuel cell and fuel pump in each race car. It is a well known problem that an automobile crash, particularly at the high speeds found in automobile racing, produces sparks. If and when the fuel pump or fuel line are broken off or ruptured, the sparks from the crash are likely to ignite the gasoline which has escaped. This burning gasoline is the cause of the "underhood fires" discussed above. An additional heat source is the engine headers which are approximately 1300 degrees Fahrenheit and can cause spontaneous combustion of gasoline vapor fumes.

The present invention will automatically cut of the flow of fuel from the fuel cell if either the fuel line is detached from the fuel pump or the fuel pump is broken off the engine block.

At the present time, when the fuel pump is activated by the engine, it urges fuel from the fuel cell toward the engine block where the fuel is combusted in the engine to propel the race car. The present invention includes a fuel cut off assembly which if the micro-switch assembly mounted on the fuel pump assembly is opened, the flow of current to the solenoid valve is cut off and the solenoid valve instantaneously closes. When the solenoid valve closes, the flow of fuel through the fuel line is instantaneously cut off.

As is well known, a fire requires fuel, flame and oxygen. Oxygen is found in the atmosphere. The flame is created by the sparks which are caused by virtually any collision which a race car may be involved in. The present invention prevents an underhood fire by cutting off the flow of fuel, typically gasoline, to the engine and to the area of the race car under the race car's hood.

The present invention has four main components. First, a fuel pump assembly 70. Second a related microswitch assembly 90. Third, a fuel flow shut off assembly 80. Fourth, a control box assembly 100.

Figure 2:
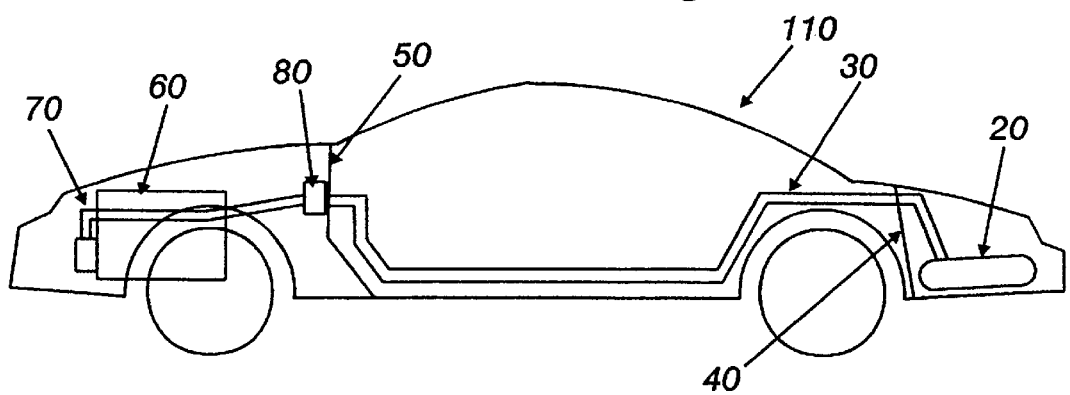
FIG. 2 is a block diagram of present day fuel cell, engine block and fuel pump and related parts.
Figure 5:
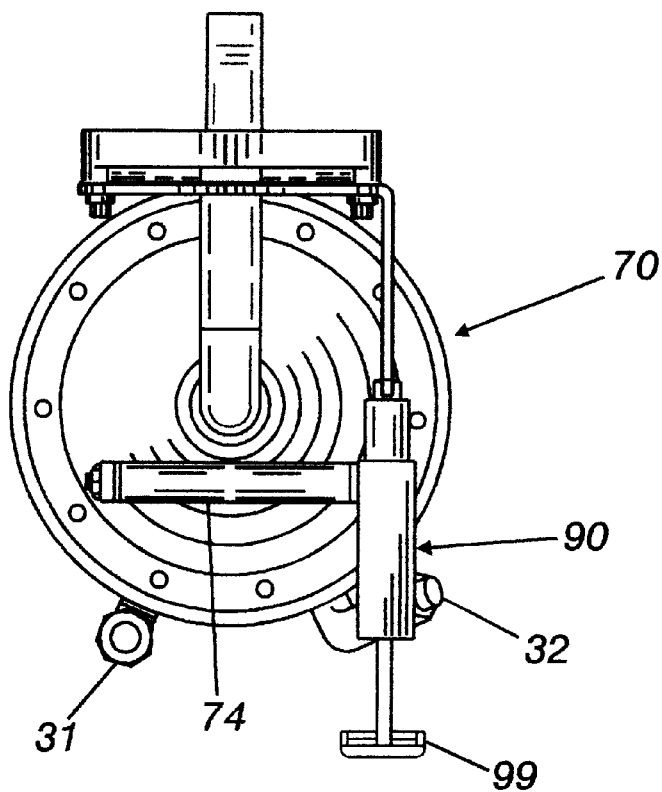
FIG. 5 is a top view of the fuel pump assembly and related microswitch assembly.
Figure 6:
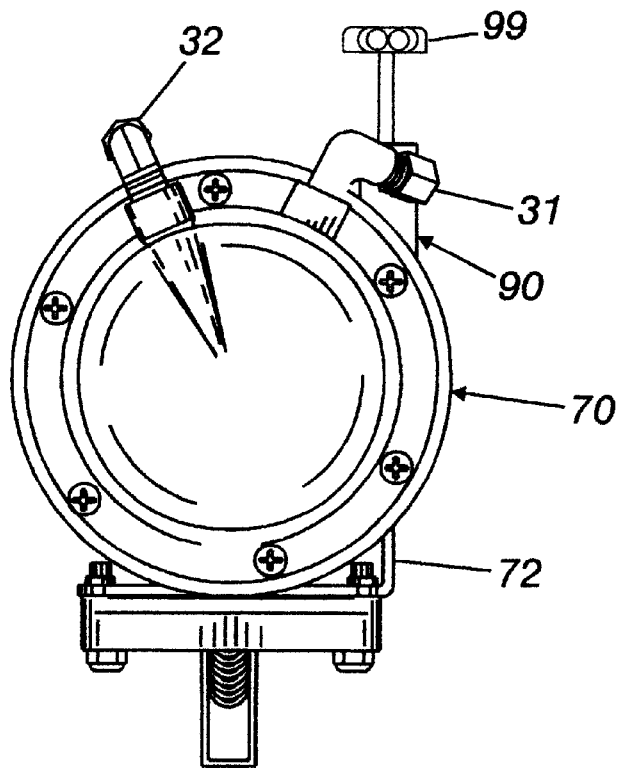
FIG. 6 is a bottom view of the fuel pump assembly and related microswitch assembly.

As seen in FIG. 1, a typical race car 110, has a number of common components. FIG. 2 shows these common components; a fuel cell 20, a fuel line 30, a rear fire wall 40, a front fire wall 50, an engine 60. Associated with the engine block is a fuel pump assembly 70. Typically, the fuel pump assembly 70 is mounted on engine 60.

As seen in FIG. 2, when the fuel pump assembly 70 is activated, it urges fuel from the fuel cell 20 toward the engine 60 where the fuel is combusted in the engine 60 to propel race car 110.

Figure 3:
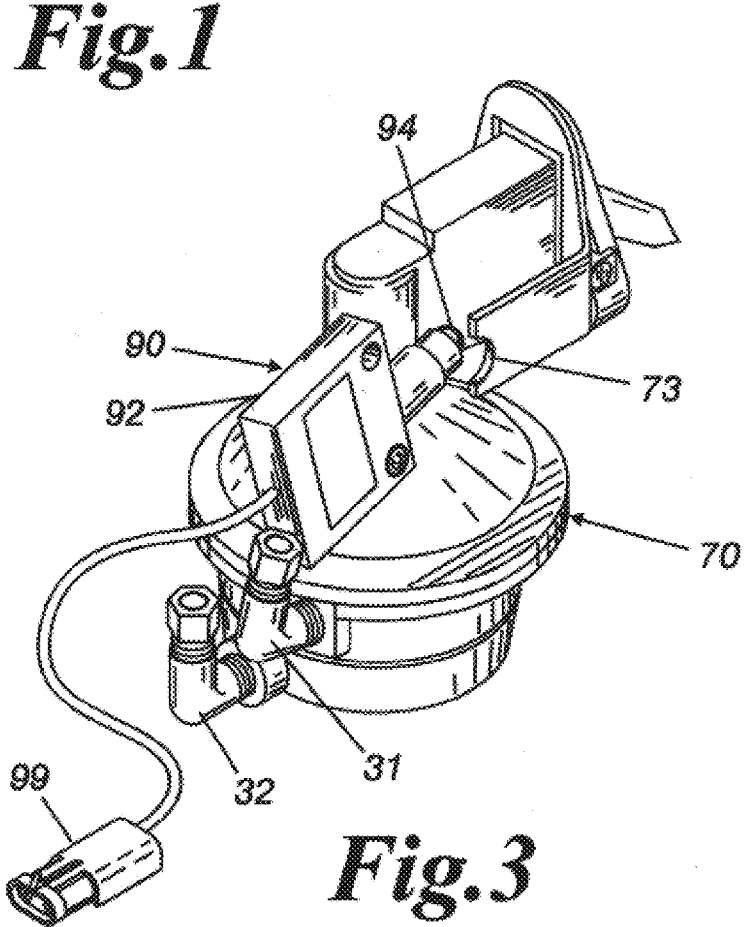
FIG. 3 is a perspective view of a typical engine fuel pump with the microswitch attached.

FIG. 3 is a perspective view of an embodiment of the fuel pump assembly 70. Fuel pump assembly is one of the components of the present invention. As discussed above, in the fuel pump assemblies found in present race cars, if the fuel pump assembly is separated from engine 60, the present day fuel pump assembly continues to syphon fuel from fuel cell 20. This is the cause of a substantial number of underhood fires after racing accidents. It can be seen that, in the present invention, fuel enters and exits fuel pump assembly 70 through fuel inlet 31 and fuel outlet 32.

FIGS. 3 and 4 show the fuel pump assembly 70 and microswitch assembly 90 portion of the present invention.

Specifically, FIGS. 3 and 4, show the microswitch assembly 90 in the "closed" position in FIG. 4. The microswitch assembly 90 is shown in the "open" position in FIG. 3. During normal operation of a race car 110, it is expected that the microswitch assembly 90 will be in the "closed" position seen in FIG. 4. When the microswitch assembly 90 is in the "closed" position, the electrical connector 99, which has an inlet for electric current and an outlet for electric current, the inlet for electric current is attached to a power source. In the preferred embodiment, this is a 12 Volt DC power source. Typically, this is a 12 Volt DC car battery.

The fuel pump assembly 70 is removably attached to the engine 60 by bracket 72. In the preferred embodiment, bracket 72 is made of mild steel and is plated with Nickel Teflon. In the preferred embodiment, bracket 72 is $^{105}/_{1000}$'s of an inch thick. In the preferred embodiment, fuel pump assembly 70 is removably fastened to bracket 72 by two $^{3}/_{8}$×16×2"12 point grade 8 bolts. Preferably, $^{3}/_{8}$ washers will be also be used to fasten fuel pump assembly 70 and bracket 72 to engine block 60. Of course, fuel pump assembly 70 does not have to be attached directly to engine 60. It could be located close to the engine such that fuel pump assembly 70 can communicate fuel to engine 60. In addition, bracket 72 and notch 73 may be thought of as limit switch locator because plunger 94, which may be described as part of a limit switch, are coupled and because de-coupled when plunger 94 and notch 73 are not in contact. In other words, bracket 72 and notch 73 may be described as a limit switch locator. Plunger 94 may be described as part of a limit switch.

FIG. 3 shows microswitch assembly 90. Microswitch 90 includes case 92, plunger 94 and electrical connector 99. When microswitch 90 is in the "closed" position seen in FIG. 4, the circuit is complete and current flows into and out of electrical connector 99. As discussed above, a voltage sources drives current into electrical connector 99 and out of electrical connector 99 when plunger 94 is depressed and in contact with notch 73, as seen in FIG. 4. In other words, the circuit is closed and electric current flows into the inlet port of electrical connector 99, thorough microswitch 90 and through the outlet port of electrical connector 99. When plunger 94 is not in contact with notch 73, plunger 94 is not depressed and the electric circuit running into the inlet port of electrical connector 99, through microswitch assembly 90, cannot exit the outlet port of electrical connector 99. In other words, the circuit is "broken" or "opened." This is important because if the circuit is broken, power will not reach any device which is connected to the outlet port of electrical connector 99 and fuel flow will stop. As discussed above, microswitch 90 may as be described as an impact sensitive limit switch.

In the preferred embodiment, microswitch assembly 90 is built by the Square D company. It is heavy duty and completely encapsulated, zinc die-cast, epoxy filled and roller plunger 94 is mounted on top of microswitch assembly 90 as seen in FIGS. 3 and 4. In the preferred embodiment, plunger 94 is made of high grade steel to resist corrosion and has a roller wheel at the end of plunger 94 which makes contact with notch 73. In the preferred embodiment, the microswitch assembly 90 includes a switch of NEMA type 1, 2, 4, 6, 6P, 12, 13, IP67. The switch has gold contacts and is dust, water, oil, gasoline and vibration resistant. Preferably, the switch will withstand vibration of 10G's and a shock load of 35G's. Preferably, the gold contacts should be rated at 5 amps at 24 Volts DC. In the preferred embodiment, electrical connector 99 will include a wiring harness consisting of 12 inches of an 18 gauge 2 conductor wire with a jacket insulation with the trade name "PUR." Electrical connector 99 is also preferably water, oil and gasoline resistant. Electrical connector 99's wire should be rated to 105 degrees Centigrade.

As seen in FIGS. 3 and 4, one end of electrical connector 99 will terminate in microswitch assembly 90. The other end, is preferably a two pin male connector located in an ABS plastic housing. At the present time, the ABS housing is made by Packard Electrical Systems and is dust and water resistant.

As discussed above, when a race car 110 is involved in an accident, the fuel pump assembly 70 is frequently broken open or torn off engine 60. At the present time, when this happens, fuel cell 20 and fuel line 30 continue to communicate fuel into the engine compartment of race car 110. This is the fuel which feeds the fire started by sparks generated in the accident which tore off or damaged fuel pump assembly 70.

As seen from the name "impact sensitive fuel control system," the goal of the present invention is to prevent fuel reaching the engine compartment of race car 110 if fuel pump assembly is damaged or torn off engine 60.

If fuel pump assembly 70 is damaged or torn off engine 60, plunger 94 of microswitch assembly 90 will be urged by the force of the collision to disconnect from notch 73, as seen in FIG. 3, to the position of non-contact between plunger 94 and notch 73 seen in FIG. 4. In other words, plunger 94 will no longer touch notch 73. As discussed above, the electric circuit formed by electrical connector 99 and microswitch 90 will be broken if plunger 94 does not contact notch 73. This is important because electrical connect 99 communicates with fuel cut off assembly 80, as seen in FIGS. 2–10 and 14.

As seen in FIG. 2, if fuel pump assembly 70 is not energized(by current flowing from electrical connector 99), it will prevent the passage of fuel through fuel line 30. In the preferred embodiment, fuel cut off assembly 80 is located such that it interrupts the flow of fuel before the fuel enters the fuel line forward of the front fire wall 50 of race car 110.

Figure 14:
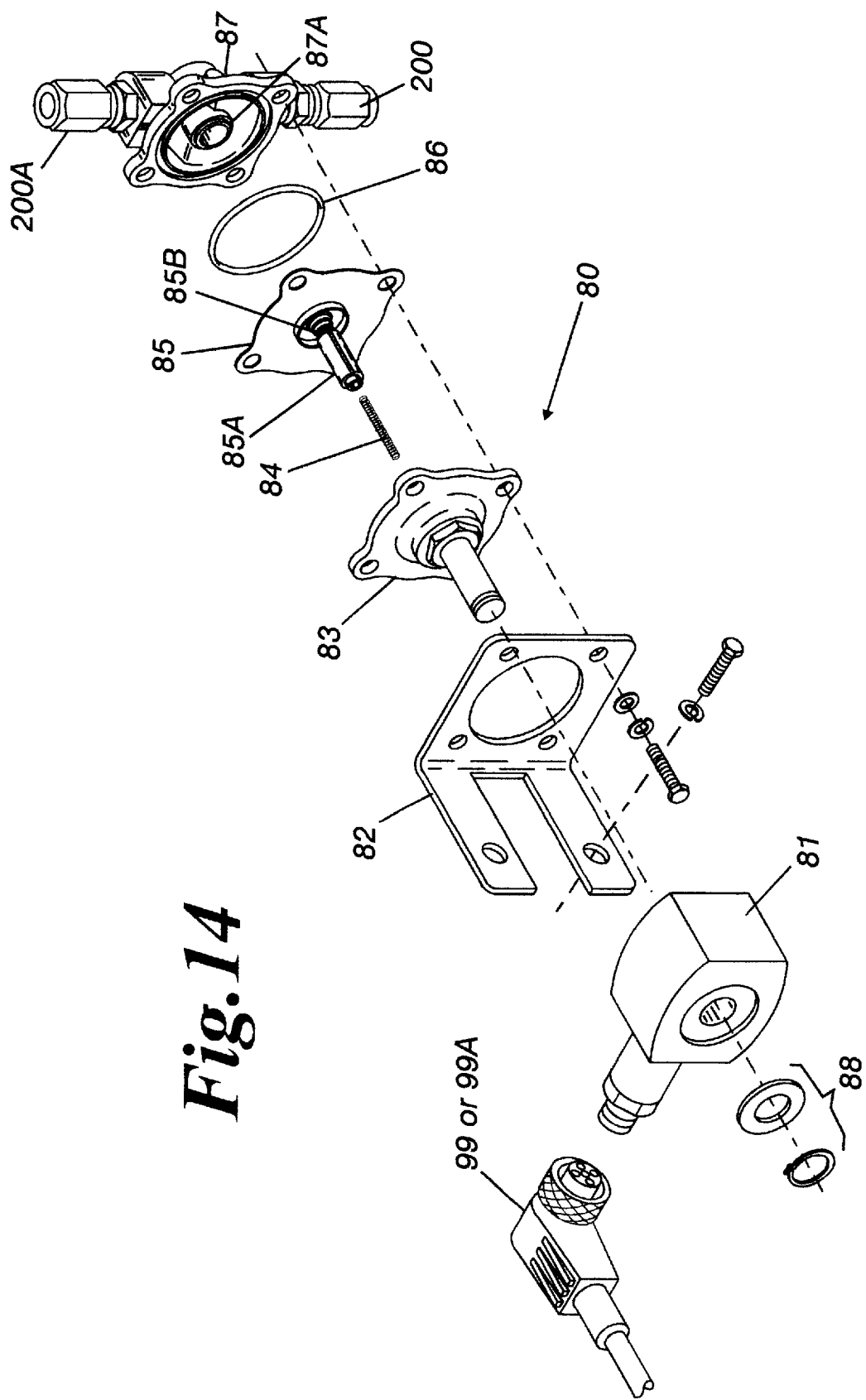
FIG. 14 is an exploded view of the fuel cut off assembly.

Turning now to FIGS. 2, 4, 11 and 14, fuel cut off assembly 80 comprises solenoid 81, holder 82, valve body 83, free spring 84, diaphragm 85, slider 85A, attached spring 85B, washer 86, base 87, orifice 87A and fasteners 88. In typical operation, plunger 94 will be in contact with notch 73 and current will flow through electrical connector 99 to solenoid 81. If fuel pump assembly 70 is damaged or torn off engine 60, plunger 94 will be urged out of contact with notch 73. Therefore, electrical connector 99 will instantly stop delivering current to solenoid 81. As best seen in FIG. 14, when microswitch 90 is in the "closed" position (seen in FIG. 4) solenoid 81 is energized and slider 85A is urged towards solenoid 81. When slider 85A is urged towards solenoid 81, slider 85A compresses free spring 84 and tensions attached spring 85B. Attached spring 85B in turn urges diaphragm 85 towards solenoid 81. When diaphragm 85 moves towards solenoid 81, fuel can flow through fuel line 30 and then through base 87 and orifice 87A.

If plunger 94 is not in contact with notch 73, current will not flow through electrical connector 99 to solenoid 81. If solenoid 81 is not energized, slider 85A will be urged towards base 87 by free spring 84. The movement of slider 85A will in turn compress attached spring 85B and re-seat diaphragm 85 against the base 87. This will prevent the flow of fuel through orifice 87A. Because fuel cannot flow, the supply of fuel to the engine or to a fire which is burning forward of the front fire wall 50 will be cut off. In other words, if the fuel pump assembly 70 is torn off or damaged, there will be no underhood fire because the flow of fuel will be instantaneously interrupted by the closing of diaphragm 85 down onto orifice 87A in valve body 87.

Figure 11:
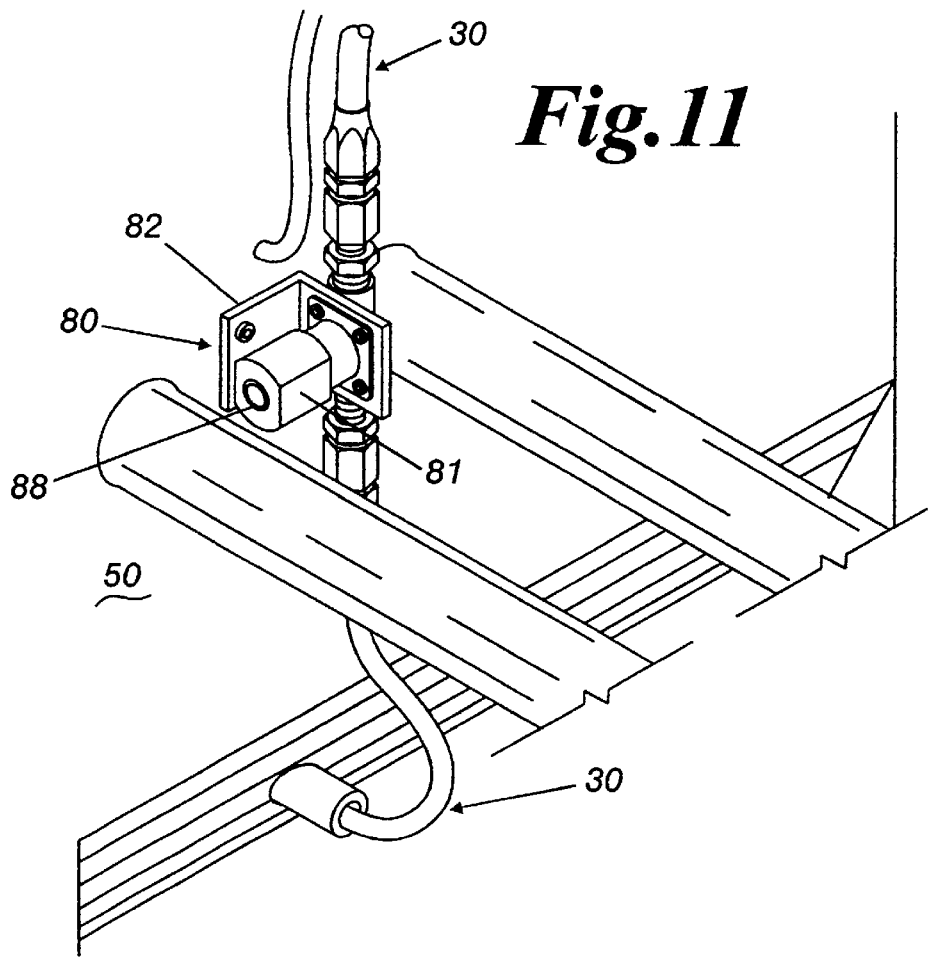
FIG. 11 is a perspective view of the fuel flow cut off assembly.

As seen in FIGS. 11 and 14, fuel cut off assembly 80 is removably fastened to race car 110 by holder 82. Also, valve body 83 slidably receives slider 85A. In addition, entire fuel cut off assembly 80 is held together by fasteners 88. Holder 82 is preferably made of mild steel and is also preferably plated with Nickel Teflon. In its preferred embodiment, holder 82 is $^{105}/_{1000}$'s of an inch thick and is mounted to front fire wall 50 by means of fasteners that include self locking nuts.

In the preferred embodiment, fuel cut off assembly 80 will operate at pressures ranging from 0 to 25 lbs. of force. In addition, in order to minimize the danger of fuel starvation caused by the present invention, orifice 87A preferably has a diameter that is 50% bigger than the diameters of fuel outlet 200A or fuel outlet 200, seen in FIG. 14. In addition, the fuel cut off assembly preferably has a pilot and bleed orifice to help seat the diaphragm. Preferably, the diaphragm is made of viton elastomer. In addition, solenoid 81 preferably are Red Hat 2 solenoid enclosures which are molded one piece construction with a built in ½" N.P.T. conduit. Preferably, solenoid 81 will operate at temperatures up to and including about 200 degrees Centigrade (425 degrees F.) and have a useful life of about 10,000 hours when connected to power dissipating resistors 106A and 106B. Preferably, solenoid 81 has a NEMA (National Electrical Manufacturers Association) classification of 1, 2, 3, 3s, 3r, 4 and 4x. Valve body 83 and base 87 are preferably T-6061 machined aluminum. In addition, the use of free spring 84 and attached spring 85B eliminates the danger that when solenoid 81 is energized that diaphragm 85 will not permit the flow of fuel. It is also preferable that fasteners 88 be tightened to 105 ft-lbs and make use of a grade 8 washer. In addition, it is also preferable to make use of safety wire to more securely fasten fasteners 88. It is also preferable to use safety wire in conjunction with the nuts and bolts which hold fuel pump assembly 70 together. Of course, fuel cut off assembly 80 could be replaced with any equivalent, such as a plunger or a ball valve or another valve that can be opened or closed.

Figure 15:
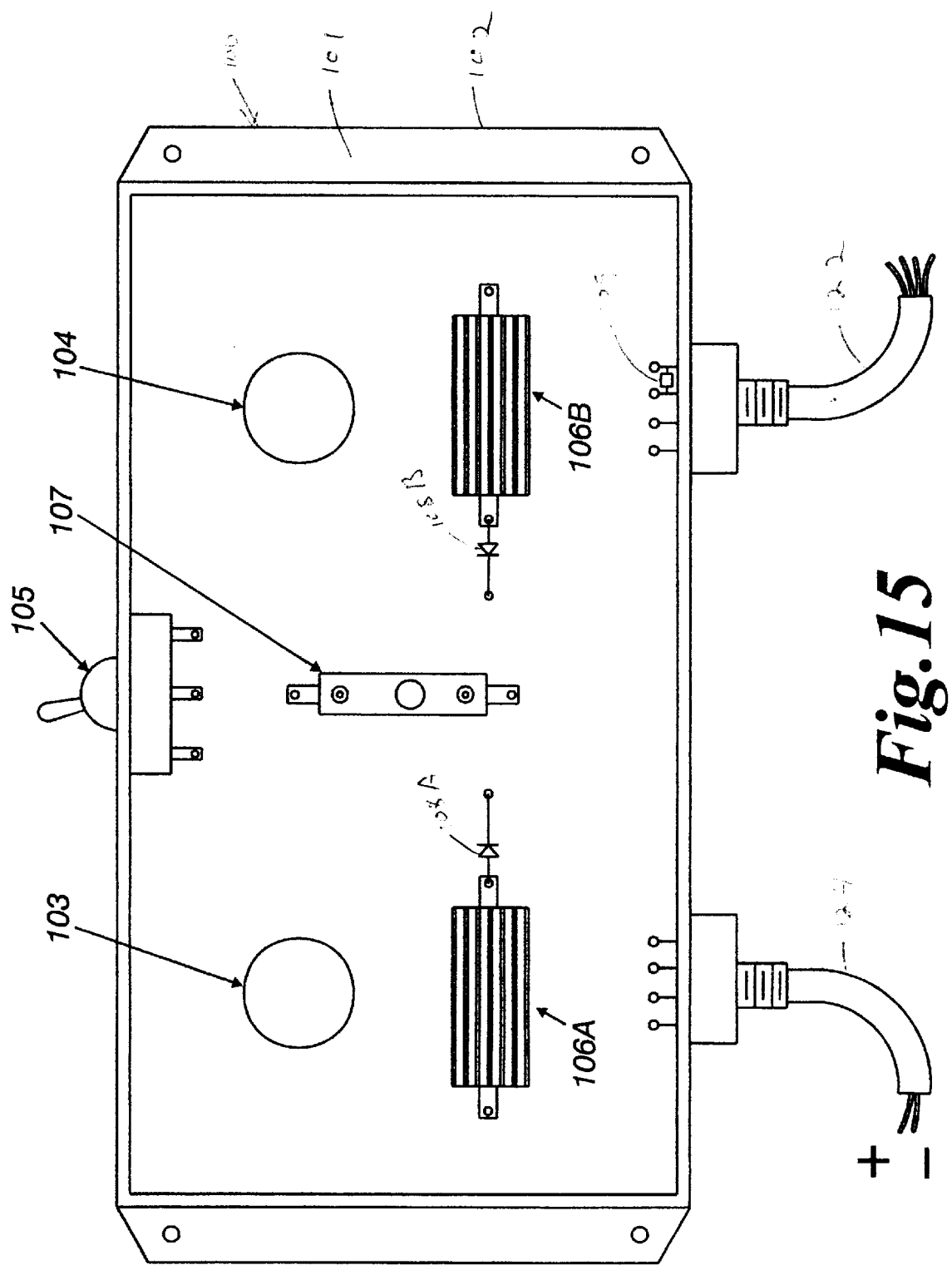
FIG. 15 is a perspective view of the control box assembly of the present invention.
Figure 16:
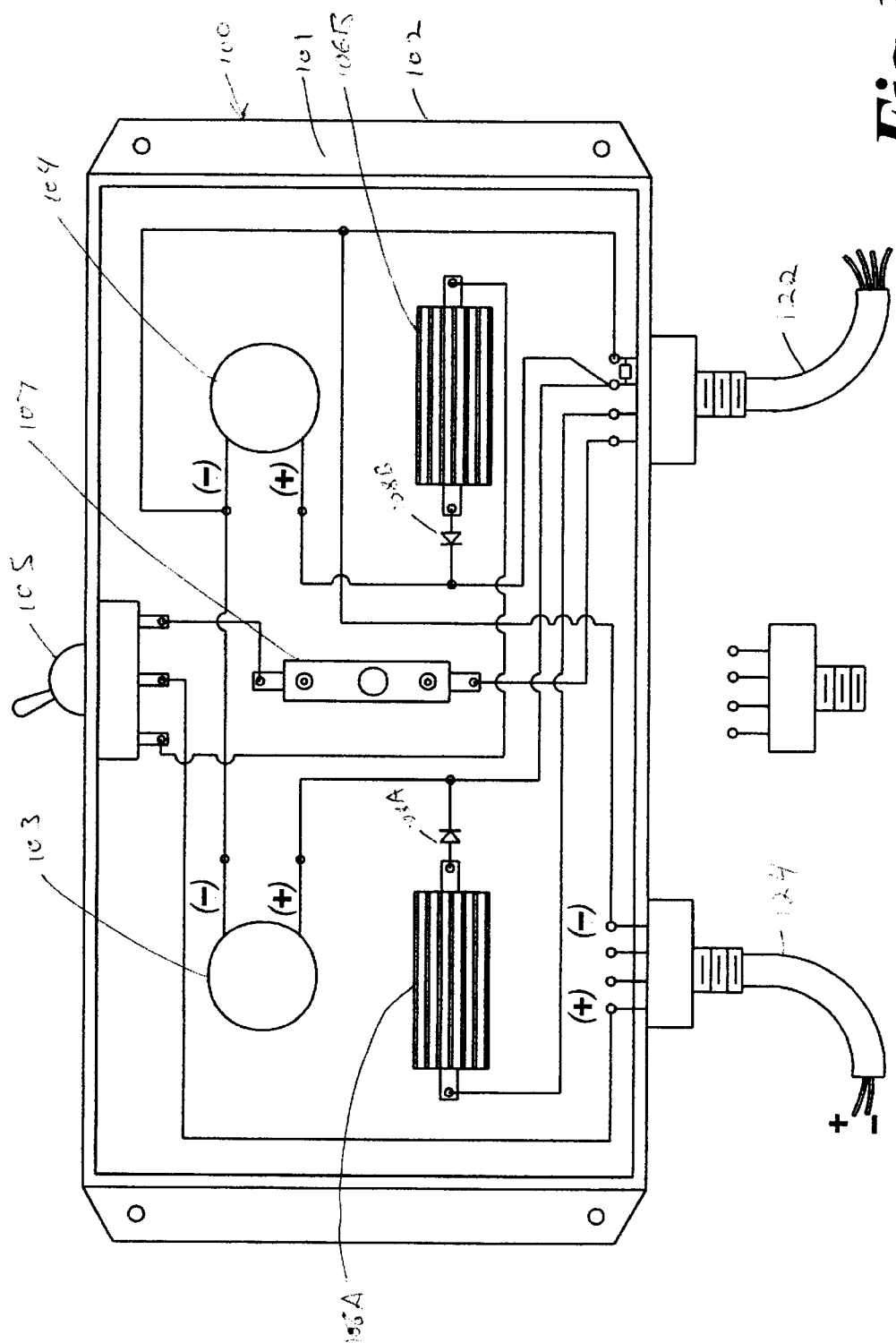
FIG. 16 is a perspective view of the control box assembly of the present invention with the wiring shown.
Figure 17:
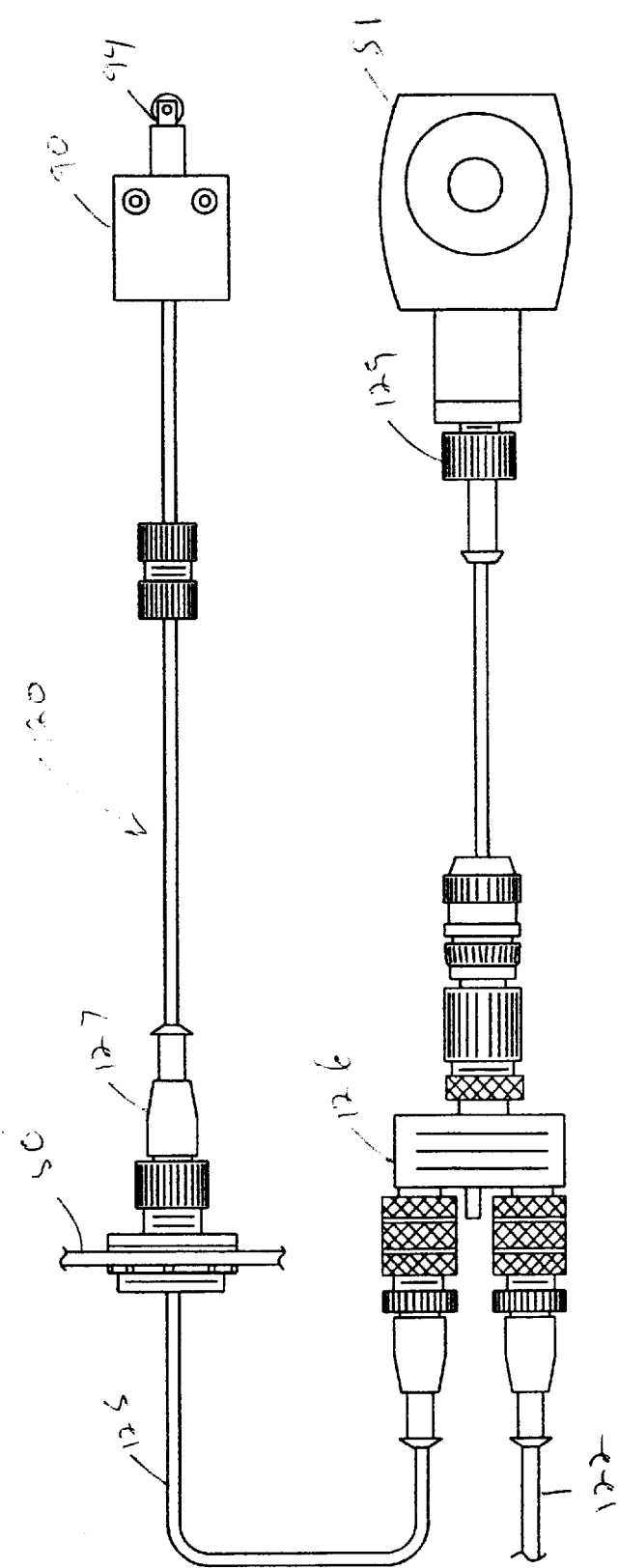
FIG. 17 is a top view of the wiring harness of the present invention.

As discussed above, electrical connection 99 communicates with fuel cut off assembly 80. As discussed above, the final assembly of the present invention is control box assembly 100. First control box assembly 100 is seen in FIGS. 15 and 16. First Control box assembly 100 is in turn connected to fuel cut off assembly 80 as seen in FIG. 17. A more specific wiring diagram of FIG. 15 is shown in FIG. 16.

As seen in FIGS. 15, 16, and 17, the control box assembly 100 is an ON/ON switch. This means that the solenoid will not be de-energized, and fuel cut off to the engine unless plunger 94 is not in contact with notch 73, as discussed above. In other words, if the control box assembly is set to "AUTO," this means that if race car 110 is subject to a collision which separates plunger 94 from notch 73, solenoid 81 will instantly drop power and the flow of fuel through fuel line 30 will instantly be interrupted.

However, if any collision does not sufficiently damage race car 110 to prevent race car 110 from continuing the race, control box assembly 100 can be set to "MANUAL." When control box assembly 100 is set to "MANUAL," microswitch assembly 90 is bypassed and solenoid 81 is energized. As explained above, when solenoid 81 is energized, fuel can reach the engine 60. Therefore, control box assembly 100 is useful if race car 110 has suffered a small accident, which has urged plunger 94 out of contact with notch 73, but is not sufficiently damaged to require race car 110 to leave the race. Of course, after suffering an accident, race car 110 would be "pitted" and plunger 94 could be pushed into contact with notch 73. If plunger 94 and notch 73 cannot physically be brought into contact, the "MANUAL" position on control box assembly 100 will energize solenoid 81 and allow fuel to flow. If for some reason the driver of race car 110 believes that there is an underhood fire, he or she can move the switch of control box assembly 100 to the "AUTO" position and solenoid 81 will be de-energized and the flow of fuel interrupted because plunger 94 is not in contact with notch 73 and the circuit is "broken." Because the circuit is "broken," solenoid 81 will be de-energized and the flow of fuel interrupted.

FIGS. 15 and 16 illustrate first control box assembly 100. First control box assembly comprises cover 101, base 102, AUTO light indicator 103, MANUAL light indicator 104, ON/ON switch 105, two power dissipating resistors 106A and 106B, circuit breaker 107, diodes 108A and 108B and resistor 109. Resistor 109 is a 3 ohm resistor which ensures that solenoid 81 does not receive greater than 12 volts at any given time. Because of the size of first control box assembly 100, it is expected that it will be mounted on the front side of the dash board of race car 110 within reach of the driver. Specifically, cover 101 is preferably made with ABS plastic with a flammability rating of 94V–0 at 0.080" thickness and a continuous use temperature of 70 degrees Centigrade. Typically, cover 101 will have a textured finish and dimensions of 4 ½"×3"×2". Base 102 will typically be made from aluminum and be about 0.125" thick. Base 102 also serves as a backing plate and heat sink for power dissipation resistors 106A and 106B. Circuit breaker 107 is preferably a 3 ampere aircraft type circuit breaker.

FIG. 15 shows AUTO indicator light 103 and MANUAL indicator light 104 protruding through cover 101. Power dissipating resistor 106A and diode 108A are associated with AUTO indicator light 103. Similarly, power dissipating resistor 106B and diode 108B are associated with MANUAL indicator light 104. The power dissipating resistors and diodes are necessary to prevent a foreshortened life for solenoid 81. Specifically, the output voltage of a typical race car 110's electrical system is 14.6 DC volts. Because solenoid 81 requires only 12 DC volts to operate, its life would be cut by about 75%. The power dissipating resistors are wrapped with wire, as seen in FIGS. 15 and 16. Combined with the base plate 102's function as an aluminum, or other highly conductive metal, heat sink allows solenoid 81 to "see" no more than 12.07 DC volts. Preferably, the wire wrapped around power dissipating resistors 106A and 106B should be epoxy encapsulated in position. In addition, diodes 108A and 108B ensure that there is no current "back flow" through power dissipating resistors 106A and 106B.

In essence, first control box assembly 100 is a junction box. In other words, race car 110 provides a power source. This power is delivered to ON/ON Switch 105. When the ON/ON Switch 105 is moved to the AUTO position, power goes through a cable to the microswitch assembly 90 and to circuit breaker 107. Then, power goes to power dissipating resistor 106A and diode 108A. Under these conditions; solenoid 81 is energized, assuming plunger 94 is contacting notch 73, fuel flows to engine 60 of race car 110. In addition, AUTO indicator light 103 is illuminated.

When ON/ON Switch 105 is in the MANUAL position, microswitch assembly 90 is by-passed. Except for microswitch assembly 90 being bypassed, first control box assembly 100 functions virtually the same way to energize solenoid 81. Of course, power flows through power dissipating resistor 106B and diode 108B. As in the AUTO position, solenoid 81 is energized, assuming plunger 94 is contacting notch 73, and fuel is flowing to engine 60 of race car 110. In this situation, MANUAL indicator light 104 is illuminated.

Figure 18:
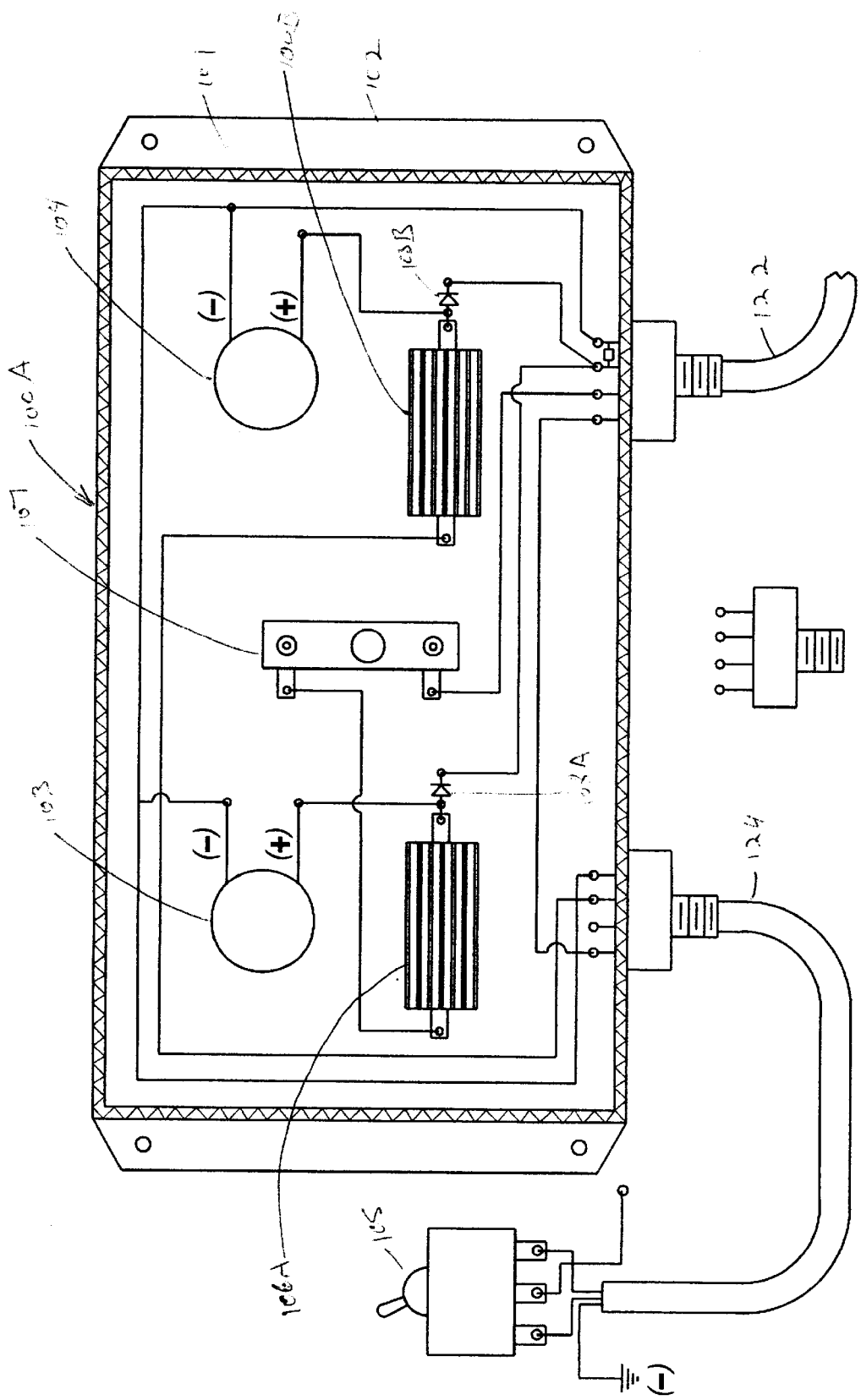
FIG. 18 is a perspective view of an alternative embodiment of the control box of the present invention.

FIG. 18 shows an alternative embodiment of the control box of the present invention. FIG. 18 shows second control box 100A. With the exception of ON/ON switch 105 being remotely mounted, first control box 100 and 100A are the same. Typically, second control box 100A will be used in a situation where less space is available and only ON/ON switch 105 will be mounted on the dash board of race car 110. In addition, in the preferred embodiment, second control box 100A will be of dimensions 2 ½"×3 ½"×2", which is smaller than first control box 100. However, it is important that the driver of race car 110 be able to see AUTO light indicator 103 and MANUAL light indicator 104.

As discussed above, electrical connection 99 communicates with fuel cut off assembly 80. As discussed above, the final assembly of the present invention is a control box assembly. In this alternative embodiment this is second control box 100A. Second control box assembly 100A is seen in FIG. 18. Second control box assembly 100A is in turn connected to fuel cut off assembly 80 and microswitch assembly 90 as seen in FIG. 17. Specifically, connector assembly 122 connects control boxes 100 and 100A to Y connector 126, seen in FIG. 17. Connector assembly 122 includes Brad Harrison connectors and all cables are preferably made with a polyurethane outer jacket and are American Wire Gauge (AWG) size # 22 with 2, 3 or 4 conductors. As seen in FIGS. 15, 16, 17 and 18, control boxs 100 and 100A are connected to the ignition system by connector 124. Connector 124 provides 12 volts to control box 100 or 100A.

FIG. 17 shows wiring harness 120 that is used in conjunction with both first control box assembly 100 or second control box assembly 100A. In other words, with both embodiments of the present invention.

As seen in FIGS. 17 and 18, the second control box assembly 100A includes a remote an ON/ON switch 105. This means that the solenoid will not be de-energized, and fuel cut off to the engine unless plunger 94 is not in contact with notch 73, as discussed above. In other words, if the control box assembly is set to "AUTO," this means that if race car 110 is subject to a collision which separates plunger 94 from notch 73, solenoid 81 will instantly drop power and the flow of fuel through fuel line 30 will instantly be interrupted.

However, if any collision does not sufficiently damage race car 110 to prevent race car 110 from continuing the race, control box assembly 100A can be set to "MANUAL." When control box assembly 100A is set to "MANUAL," microswitch assembly 90 is bypassed and solenoid 81 is energized. As explained above, when solenoid 81 is energized, fuel can reach the engine 60. Therefore, control box assembly 100A is useful if race car 110 has suffered a small accident, which has urged plunger 94 out of contact with notch 73, but is not sufficiently damaged to require race car 110 to leave the race. Of course, after suffering an accident, race car 110 would be "pitted" and plunger 94 could be pushed into contact with notch 73. If plunger 94 and notch 73 cannot physically be brought into contact, the "MANUAL" position on control box assembly 100A will energize solenoid 81 and allow fuel to flow. If for some reason the driver of race car 110 believes that there is an underhood fire, he or she can move the switch of control box assembly 100A to the "AUTO" position and solenoid 81 will be de-energized and the flow of fuel interrupted because plunger 94 is not in contact with notch 73 and the circuit is "broken." Because the circuit is "broken," solenoid 81 will be de-energized and the flow of fuel interrupted.

FIG. 18 illustrates second control box assembly 100A. Second control box assembly 100A comprises cover 101, base 102, AUTO light indicator 103, MANUAL light indicator 104, ON/ON switch 105, two power dissipating resistors 106A and 106B, circuit breaker 107, diodes 108A and 108B and resistor 109. Resistor 109 is a 3 ohm resistor which ensures that solenoid 81 does not receive greater than 12 volts at any given time. Because of the smaller size of second control box assembly 100A, it is expected that it will be mounted beneath the dash board of race car 110 with only ON/ON switch 105 within reach of the driver. Specifically, cover 101 is preferably made with ABS plastic with a flammability rating of 94V—0 at 0.080" thickness and a continuous use temperature of 70 degrees Centigrade. Typically, cover 101 will have a textured finish and dimensions of 2 ½"×3 ½"×2". Base 102 will typically be made from aluminum and be about 0.125" thick. Base 102 also serves as a backing plate and heat sink for power dissipation resistors 106A and 106B. Circuit breaker 107 is preferably an 3 ampere aircraft type circuit breaker.

FIG. 18 shows AUTO indicator light 103 and MANUAL indicator light 104 protruding through cover 101. Power dissipating resistor 106A and diode 108A are associated with AUTO indicator light 103. Similarly, power dissipating resistor 106B and diode 108B are associated with MANUAL indicator light 104. The power dissipating resistors and diodes are necessary to prevent a foreshortened life for solenoid 81. Specifically, the output voltage of a typical race car 110's electrical system is 14.6 DC volts. Because solenoid 81 requires only 12 DC volts to operate, its life would be cut by about 75%. The power dissipating resistors are wrapped with wire, as seen in FIGS. 15 and 16. Combined with the base plate 102's function as an aluminum, or other highly conductive metal, heat sink allows solenoid 81 to "see" no more than 12.07 DC volts. Preferably, the wire wrapped around power dissipating resistors 106A and 106B should be epoxy encapsulated in position. In addition, diodes 108A and 108B ensure that there is no current "back flow" through power dissipating resistors 106A and 106B.

In essence, second control box assembly 100A is a junction box. In other words, race car 110 provides a power source. This power is delivered to ON/ON Switch 105. When the ON/ON Switch 105 is moved to the AUTO position, power goes through a cable to the microswitch assembly 90 and to circuit breaker 107. Then, power goes to power dissipating resistor 106A and diode 108A. Under these conditions; solenoid 81 is energized, assuming plunger 94 is contacting notch 73, fuel flows to engine 60 of race car 110. In addition, AUTO indicator light 103 is illuminated.

When ON/ON Switch 105 is in the MANUAL position, microswitch assembly 90 is by-passed. Except for microswitch assembly 90 being bypassed, second control box assembly 100A functions virtually the same way to energize solenoid 81. Of course, power flows through power dissipating resistor 106B and diode 108B. As in the AUTO position, solenoid 81 is energized, assuming plunger 94 is contacting notch 73, and fuel is flowing to engine 60 of race car 110. In addition, MANUAL indicator light 104 is illuminated.

FIG. 17 shows the interconnection of solenoid 81, microswitch assembly 90 and control box 100 or 100A by wiring harness 120. Specifically, connector assembly 122 links control box 100 or 100A to Y connector 126. In the preferred embodiment, the bottom leg of Y connector 126 is a male five prong connector and the two arms of Y connector 126 are five prong female connectors. All connectors have a screw ring built into the housing of Y connector 126. Connector 125 passes through front fire wall 50 and connects to connector 127. Connector 127 connects to electrical connector 99. In the preferred embodiment, electrical connector 99 is a "snap" type connector. Preferably, the "snap" type connector is a male connector which snaps into a female connector which is epoxied into microswitch assembly 90. In addition, connector 129 connects Y connector 126 to solenoid 81. As discussed above, if plunger 94 is not in electrical contact with notch 73, the circuit is broken and solenoid 81 will not be energized and fuel flow will be instantly interrupted.

It is understood that the foregoing description and specific embodiments are merely illustrative of the best mode of the invention and the principles thereof, and that various modifications and additions may be made to the appartus by those skilled in the art, without departing from the spirit and scope of the invention, which is limited only by the scope of the appended claims.

I claim:

1. An impact sensitive fuel supply control system, comprising:
    a fuel cell and a fuel line connecting said fuel cell to an engine;
    an electromechanically activated valve connected to said fuel line;
    a fuel pump located proximate to said engine;
    an impact sensative mechanical limit switch coupled to a limit switch locator mounted on or adjacent to said fuel pump;
    said electromechanically activated valve and said impact sensative mechanical limit switch in series in an electrical circuit which is interrupted when said switch and said limit switch locator are dislocated.

2. An impact sensitive fuel supply control system as in claim 1 wherein said electromechanically activated valve comprises a solenoid, a holder, a valve body, a free spring, a diaphram, a slider, an attached spring, a washer, a base, an oriface and a fastener.

3. An impact sensitive fuel supply control system as in claim 1 wherein said impact sensative mechanical limit switch comprises a case, a plunger and an electrical connector.

4. An impact sensitive fuel supply control system as in claim 1 wherein said limit switch locator is integral with said fuel pump.

5. An impact sensitive fuel supply control system as in claim 1 wherein said impact sensative mechanical limit switch is mounted on the upper body of said fuel pump.

6. An impact sensitive fuel supply control system as in claim 1 wherein said limit switch locator further comprises a notch.

7. An impact sensitive fuel supply control system as in claim 1 wherein said limit switch locator further comprises a groove.

8. An impact sensitive fuel supply control system as in claim 1 wherein said limit switch locator further comprises a location sized to movably retain said impact sensative mechanical limit switch.

9. An impact sensitive fuel supply control system for race cars, comprising:
    a fuel cell and a fuel line connecting said fuel cell to an engine;
    an electromechanically activated valve connected to said fuel line;
    a fuel pump located proximate to said engine;
    an impact sensative mechanical limit switch coupled to a limit switch locator mounted on or adjacent to said fuel pump;
    said electromechanically activated valve and said impact sensative mechanical limit switch in series in an electrical circuit which is interrupted when said switch and said limit switch locator are dislocated.

10. An impact sensitive fuel supply control system as in claim 9 wherein said electromechanically activated valve comprises a solenoid, a holder, a valve body, a free spring, a diaphragm, a slider, an attached spring, a washer, a base, an oriface and a fastener.

11. An impact sensitive fuel supply control system as in claim 9 wherein said impact sensative mechanical limit switch comprises a case, a plunger and an electrical connector.

12. An impact sensitive fuel supply control system as in claim 9 wherein said limit switch locator is integral with said fuel pump.

13. An impact sensitive fuel supply control system as in claim 9 wherein said impact sensative mechanical limit switch is mounted on the upper body of said fuel pump.

14. An impact sensitive fuel supply control system as in claim 9 wherein said limit switch locator further comprises a notch.

15. An impact sensitive fuel supply control system as in claim 9 wherein said limit switch locator further comprises a groove.

16. An impact sensitive fuel supply control system as in claim 9 wherein said limit switch locator further comprises a location sized to movably retain said impact sensative mechanical limit switch.

17. An impact sensitive fuel supply control system kit for increasing crashworthiness of race cars, comprising:
    an electromechanically activated valve;
    an impact sensative mechanical limit switch coupled to a limit switch locator, said limit switch locator sized such that it may be readily mounted on or adjacent to a fuel pump;
    said electromechanically activated valve and said impact sensative mechanical limit switch in series in an electrical circuit which is interrupted when said switch and said limit switch locator are dislocated.

18. An impact sensitive fuel supply control system as in claim 17 wherein said electromechanically activated valve comprises a solenoid, a holder, a valve body, a free spring, a diaphram, a slider, an attached spring, a washer, a base, an oriface and a fastener.

19. An impact sensitive fuel supply control system as in claim 17 wherein said impact sensative mechanical limit switch comprises a case, a plunger and an electrical connector.

* * * * *